US011645731B2

(12) United States Patent
McNabb

(10) Patent No.: US 11,645,731 B2
(45) Date of Patent: May 9, 2023

(54) SIMPLIFIED AUTHENTICATION OF MOBILE DEVICE BY VEHICLE FOR SHARED OR AUTONOMOUS VEHICLES

(71) Applicant: FORD GLOBAL TECHNOLOGIES, LLC, Dearborn, MI (US)

(72) Inventor: David McNabb, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 799 days.

(21) Appl. No.: 15/946,123

(22) Filed: Apr. 5, 2018

(65) Prior Publication Data

US 2019/0311452 A1 Oct. 10, 2019

(51) Int. Cl.
| | |
|---|---|
| *G06Q 10/02* | (2012.01) |
| *G06Q 50/30* | (2012.01) |
| *G06F 21/35* | (2013.01) |
| *H04L 9/08* | (2006.01) |

(52) U.S. Cl.
CPC .......... *G06Q 50/30* (2013.01); *G06F 21/35* (2013.01); *H04L 9/0819* (2013.01); *G06Q 2220/00* (2013.01)

(58) Field of Classification Search
CPC .... G06Q 50/30; G06Q 2220/00; G06Q 10/02; G06F 21/35; H04L 9/0819; H04H 20/61
USPC ............. 705/5, 13, 14.63; 455/3.01
See application file for complete search history.

(56) References Cited

U.S. PATENT DOCUMENTS

| | | | | |
|---|---|---|---|---|
| 9,656,633 | B2* | 5/2017 | Nelson | B60R 16/023 |
| 9,875,589 | B1* | 1/2018 | Buttolo | G07C 9/00571 |
| 10,877,637 | B1* | 12/2020 | Antos | G06F 21/32 |
| 2014/0220883 | A1* | 8/2014 | Emigh | H04H 20/61 |
| | | | | 455/3.01 |
| 2015/0341766 | A1* | 11/2015 | Nelson | G08B 25/016 |
| | | | | 455/404.2 |
| 2016/0144826 | A1* | 5/2016 | Nelson | B60R 16/023 |
| | | | | 701/2 |
| 2017/0178035 | A1 | 6/2017 | Grimm et al. | |
| 2017/0308817 | A1* | 10/2017 | Miller | H04W 4/80 |
| 2017/0357916 | A1* | 12/2017 | Shelby | G06Q 10/02 |
| 2020/0184518 | A1* | 6/2020 | Bains | G06Q 30/02 |

FOREIGN PATENT DOCUMENTS

EP 3160067 A1 * 4/2017

OTHER PUBLICATIONS

Perez, Sarah, "Apple Developers Must Now Agree to Ad Identifier Rules or Risk App Store Rejection", Apr. 11, 2014, techcrunch.com, 6 pages. (Year: 2014).*

* cited by examiner

*Primary Examiner* — Shannon S Campbell
*Assistant Examiner* — Freda A Nelson
(74) *Attorney, Agent, or Firm* — Joseph M. Zane; Brooks Kushman P.C.

(57) ABSTRACT

A key and an advertisement identifier are received from a share server responsive to a request for a ride. The advertisement identifier is utilized to execute a share application installed to the memory. A local connection is established to a vehicle sending an advertisement that matches the advertisement identifier. Access is gained to the vehicle for the ride using the local connection.

23 Claims, 5 Drawing Sheets

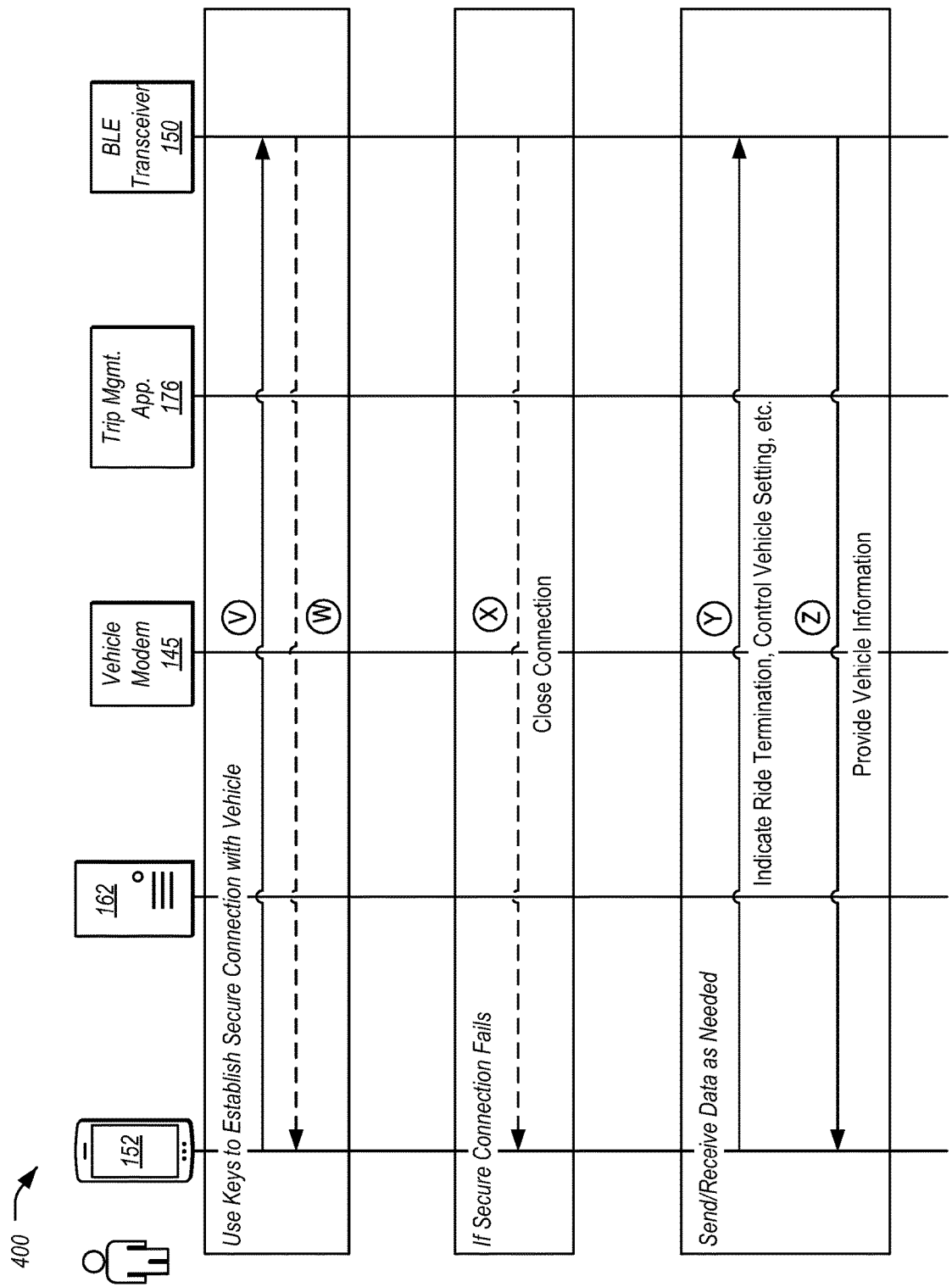

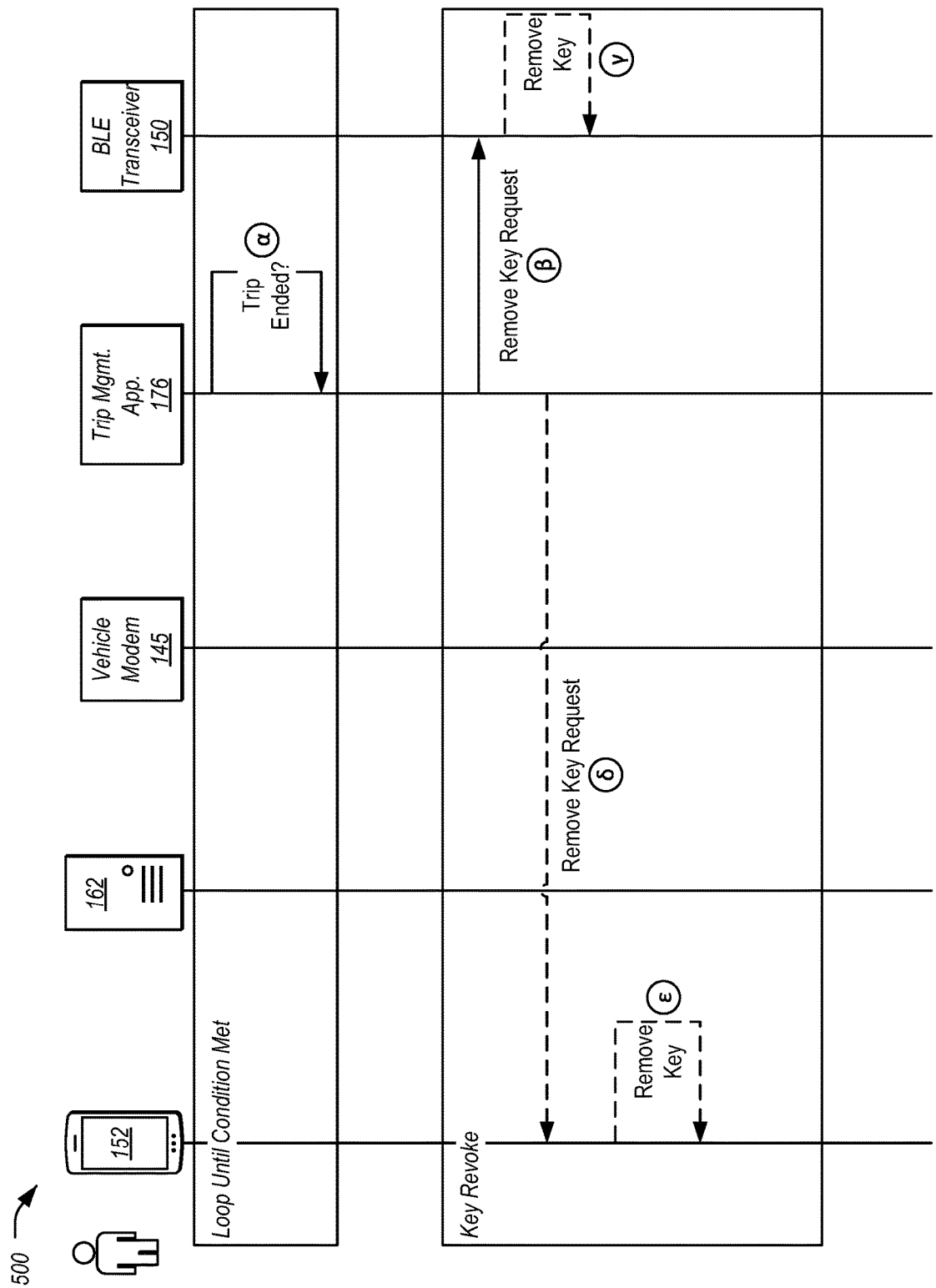

US 11,645,731 B2

SIMPLIFIED AUTHENTICATION OF MOBILE DEVICE BY VEHICLE FOR SHARED OR AUTONOMOUS VEHICLES

TECHNICAL FIELD

Aspects of the disclosure generally relate to simplified authentication of a mobile device by a vehicle for use in shared or autonomous vehicles.

BACKGROUND

Ride-sharing refers to a service that arranges shared rides for one or more persons in a vehicle. A ride-sharing user may use his or her smartphone or other mobile device to request a ride. Vehicle-sharing is a model of car rental where people rent cars for short periods of time, often by the hour. Such sharing systems may require authentication of drivers or riders so that the vehicles are only accessed by the correct passengers.

SUMMARY

In one or more illustrative embodiments, a system includes a memory, a transceiver, and a processor. The processor is programmed to receive a key and an advertisement identifier from a share server responsive to a request for a ride, utilize the advertisement identifier to execute a share application installed to the memory, establish a local connection to a vehicle sending an advertisement that matches the advertisement identifier, and gain access to the vehicle for the ride using the local connection.

In one or more illustrative embodiments, a vehicle includes a modem, a transceiver, and a processor. The processor is programmed to, responsive to occurrence of a scheduled time and location for initiating access to a vehicle, direct the transceiver to periodically provide advertisements including an advertisement identifier received from a server via the modem, and establish, using the transceiver and a key sent to the vehicle and the mobile device from the server, a secure connection with a mobile device responding to the advertisements.

In one or more illustrative embodiments, a method includes receiving, by a mobile device, a key and an advertisement identifier from a share server responsive to a request for a ride sent from the device; utilizing the advertisement identifier to activate a share application installed to the device; establishing a local connection to a vehicle responsive to receiving an advertisement from the vehicle that matches the advertisement identifier; and gaining access to the vehicle for the ride using the local connection.

BRIEF DESCRIPTION OF THE DRAWINGS

FIG. 4 illustrates an example data flow diagram for securing and using the connection between the mobile device and the vehicle; and FIG. 5 illustrates an example data flow diagram for operations performed relating to conclusion of a trip.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicles used for autonomous ride-hailing or vehicle-sharing services require automated authentication of a rider or driver to the vehicle to allow access to the vehicle. This is because there may be no driver or employee present to confirm the identity of the user to allow the user to access the vehicle. One possible approach is to use a BLUETOOTH Low Energy (BLE) connection between a user's phone or other mobile device and the vehicle, with cryptographic keys delivered to both the mobile device and the vehicle that can be used to establish a secure BLUETOOTH session after a series of BLUETOOTH data transmissions between the vehicle and the mobile device. However, current implementations of this method require the user to have their mobile device unlocked with a proprietary application running in the foreground of the mobile device. Customers may not be aware of these conditions and, even if they are aware, these conditions may be an inconvenience to customers.

To avoid these inconveniences, a secure session may be established between the mobile device and the vehicle that does not require the user to actively interact with the mobile device. So long as the user has the application open on the mobile device and running in the background, the authentication can be completed when the user initially approaches the vehicle, whether the application is running in the foreground or background, and regardless of whether the mobile device is unlocked. Therefore, the user is able to leave the mobile device in a purse or pocket, such that the authentication is automatically completed during the user's approach to the vehicle. This also allows the user to be authenticated from outside a vehicle that the user has not accessed previously, which supports use cases such as vehicle sharing and autonomous vehicles.

Figure 1:
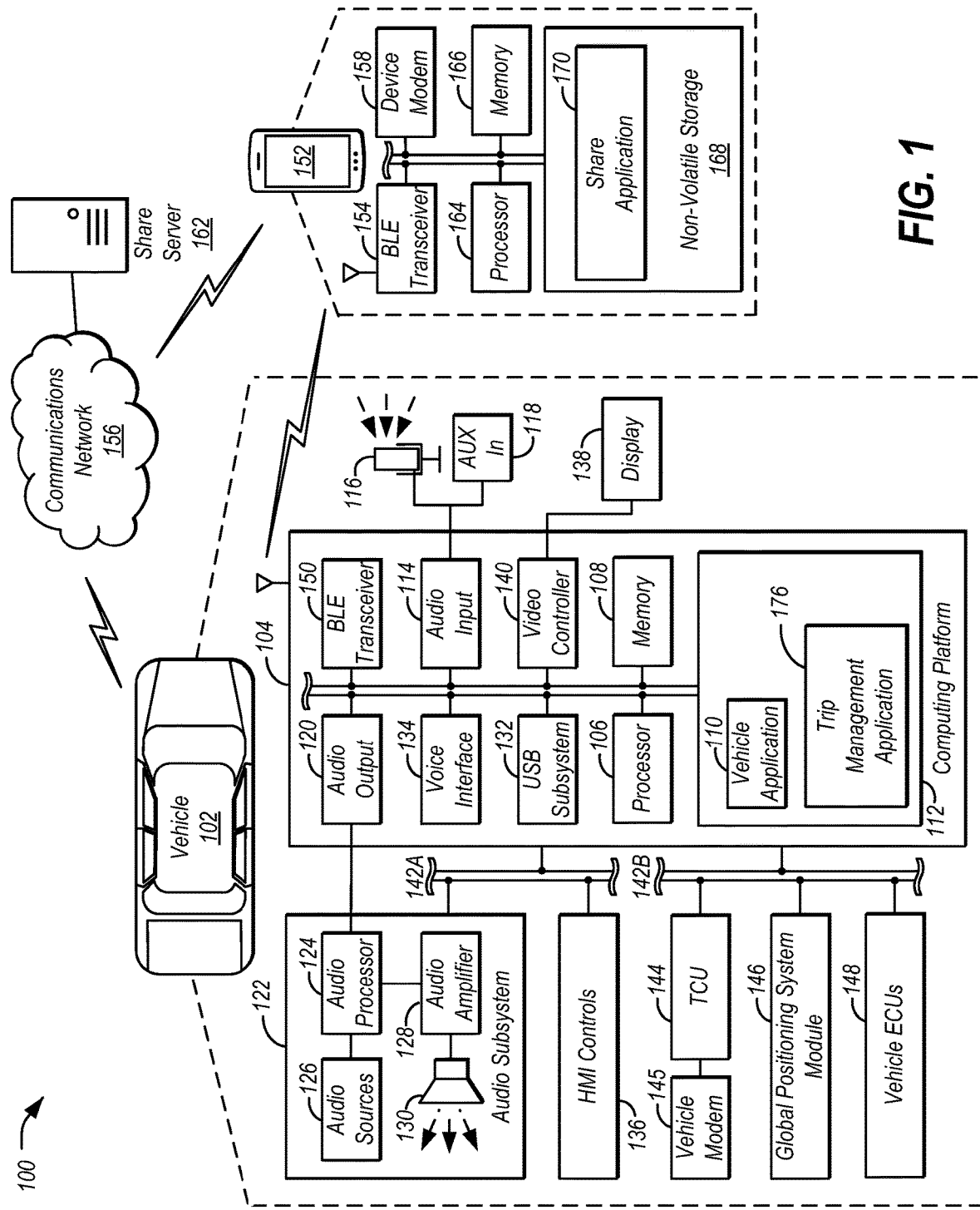
FIG. 1 illustrates an example diagram of a system configured to provide telematics services to a vehicle.

FIG. 1 illustrates an example diagram of a system 100 configured to provide telematics services to a vehicle 102. The vehicle 102 may include various types of passenger vehicle, such as crossover utility vehicle (CUV), sport utility vehicle (SUV), truck, recreational vehicle (RV), boat, plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

A computing platform 104 may include one or more processors 106 configured to perform instructions, commands, and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, JAVA, C, C++, C#, OBJECTIVE C, FORTRAN, PASCAL, JAVA SCRIPT, PYTHON, PERL, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and an auxiliary audio input 118 configured to receive audio signals from connected devices. The auxiliary audio input 118 may be a physical connection, such as an electrical wire or a fiber optic cable, or a wireless input, such as a BLUETOOTH audio connection or Wi-Fi connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of an audio subsystem 122 having audio playback functionality. In other examples, the computing platform 104 may provide platform audio from the audio output 120 to an occupant through use of one or more dedicated speakers (not illustrated). The audio output 120 may include, as some examples, system generated chimes, pre-recorded chimes, navigation prompts, other system prompts, or warning signals.

An audio subsystem 122 may include an audio processor 124 configured to perform various operations on audio content received from a selected audio source 126 and to platform audio received from the audio output 120 of the computing platform 104. The audio processors 124 may be one or more computing devices capable of processing audio and/or video signals, such as a computer processor, microprocessor, a digital signal processor, or any other device, series of devices or other mechanisms capable of performing logical operations. The audio processor 124 may operate in association with a memory to execute instructions stored in the memory. The instructions may be in the form of software, firmware, computer code, or some combination thereof, and when executed by the audio processors 124 may provide audio recognition and audio generation functionality. The instructions may further provide for audio cleanup (e.g., noise reduction, filtering, etc.) prior to the processing of the received audio. The memory may be any form of one or more data storage devices, such as volatile memory, non-volatile memory, electronic memory, magnetic memory, optical memory, or any other form of data storage device.

The audio subsystem 122 may further include an audio amplifier 128 configured to receive a processed signal from the audio processor 124. The audio amplifier 128 may be any circuit or standalone device that receives audio input signals of relatively small magnitude, and outputs similar audio signals of relatively larger magnitude. The audio amplifier 128 may be configured to provide for playback through vehicle speakers 130 or headphones (not illustrated).

The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118. For instance, the audio sources 126 may also include Wi-Fi streamed audio, USB streamed audio, Bluetooth streamed audio, internet streamed audio, TV audio, as some other examples.

The computing platform 104 may utilize a voice interface 134 to provide a hands-free interface to the computing platform 104. The voice interface 134 may support speech recognition from audio received via the microphone 116 according to a standard grammar describing available command functions, and voice prompt generation for output via the audio subsystem 122. The voice interface 134 may utilize probabilistic voice recognition techniques using the standard grammar in comparison to the input speech. In many cases, the voice interface 134 may include a standard user profile tuning for use by the voice recognition functions to allow the voice recognition to be tuned to provide good results on average, resulting in positive experiences for the maximum number of initial users. In some cases, the system may be configured to temporarily mute or otherwise override the audio source specified by an input selector when an audio prompt is ready for presentation by the computing platform 104 and another audio source 126 is selected for playback.

The microphone 116 may also be used by the computing platform 104 to detect the presence of in-cabin conversations between vehicle occupants. In an example, the computing platform may perform speech activity detection, and then apply the results to a classification algorithm configured to classify the samples as either speech or non-speech. The classification algorithm may utilize various types of artificial intelligence algorithm, such as pattern matching classifiers, K nearest neighbor classifiers, as some examples.

The computing platform 104 may also receive input from human-machine interface (HMI) controls 136 configured to provide for occupant interaction with the vehicle 102. For instance, the computing platform 104 may interface with one or more buttons or other HMI controls configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as a telematics control unit 144 having a vehicle modem 145, a global positioning system (GPS) module 146 configured to provide current vehicle 102 location and heading information, and various vehicle electronic control units (ECUs) 148 configured to cooperate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors, and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the audio module 122 and the HMI controls 136 may communicate with the computing platform 104 over a first in-vehicle network 142-A, and the telematics control unit 144, GPS module 146, and vehicle ECUs 148 may communicate with the computing platform 104 over a second in-vehicle network 142-B. In other examples, the computing platform 104 may be connected to more or fewer in-vehicle networks 142. Additionally or alternately, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the computing platform 104. In many examples, the computing platform 104 may include a BLUETOOTH Low Energy (BLE) transceiver 150 configured to communicate with a compatible BLE transceiver 154 of the mobile device 152. It should be noted that BLE is only one example, and in other examples, classic BLUETOOTH, ZIGBEE, Wi-Fi, or another short range wireless protocol may be used.

A communications network 156 may provide communications services, such as packet-switched network services (e.g., Internet access, VoIP communication services), to devices connected to the communications network 156. An example of a communications network 156 may include a cellular telephone network.

Mobile devices 152 may have network connectivity to the communications network 156 via a device modem 158 of the mobile device 152. The vehicle 102 may have network connectivity to the communications network 156 via a vehicle modem 145. To facilitate the communications over the communications network 156, mobile devices 152 and vehicle 102 may be associated with unique device identifiers (e.g., mobile device numbers (MDNs), Internet protocol (IP) addresses, etc.) to identify the communications of the mobile devices 152 over the communications network 156. In some examples, such as for vehicles 102 confined to a region (e.g., a resort or a city center), vehicles 102 communication may additionally or alternately be performed via Wi-Fi, dedicated short range communications (DSRC), or via another short to medium range connectivity solution.

Similar to the computing platform 104, the mobile device 152 may include one or more processors 164 configured to execute instructions of mobile applications loaded to a memory 166 of the mobile device 152 from storage medium 168 of the mobile device 152. In some examples, the mobile applications may be configured to communicate with the computing platform 104 via the BLE transceiver 154 and with various network services via the device modem 158.

A share application 170 may be an example of such a mobile application. The share application 170 may be installed to the mobile device 152 to allow the mobile device 152 to request use of a vehicle 102. The share application 170 may also cause the mobile device 152 to communicate with the vehicle 102 via the BLE transceiver 154. It should be noted that in some examples, classic BLUETOOTH or Wi-Fi could also be used for communication, provided there is an exterior mechanism to wake the vehicle 102, such as a door handle switch or keypad panel.

A share server 162 may include various types of computing apparatus, such as a computer workstation, a server, a desktop computer, a virtual server instance executed by a mainframe server, or some other computing system and/or device. Similar to the computing platform 104, the share server 162 may include a memory on which computer-executable instructions may be maintained, where the instructions may be executable by one or more processors of the share server 162. As discussed in detail below, the share server 162 may be configured to schedule and manage the use of the vehicles 102, receive vehicle 102 usage requests from users, and assign an available vehicle 102 to a user. The share server 162 may also be configured to generate cryptographic keys that may be used to authenticate the mobile device 152 of the user to the vehicle 102. The share server 162 may communicate with the mobile device 152 and the vehicles 102 via the communications network 156.

A trip management application 176 may be an example of a vehicle application 110 installed to the storage 112 of the computing platform 104. When executed by the vehicle 102, the trip management application 176 may cause the vehicle 102 to manages scheduled trips for the vehicle 102. While shown as being stored and executed by a computing platform 104 that performs telematics functions, it should be noted that in other examples, the trip management application 176 functionality may be performed by another ECU 148, or by a standalone ECU 148 of the vehicle 102.

Using the components of the system 100, services such as vehicle-sharing, ride-sharing, or ride-hailing may be performed. A user may make a reservation to use a vehicle 102, for example, to be able to drive the vehicle 102 for a limited time period, or in the case of an autonomous vehicle 102, to provide a ride to the user from a requested pickup point to a requested drop-off point.

Figure 2:
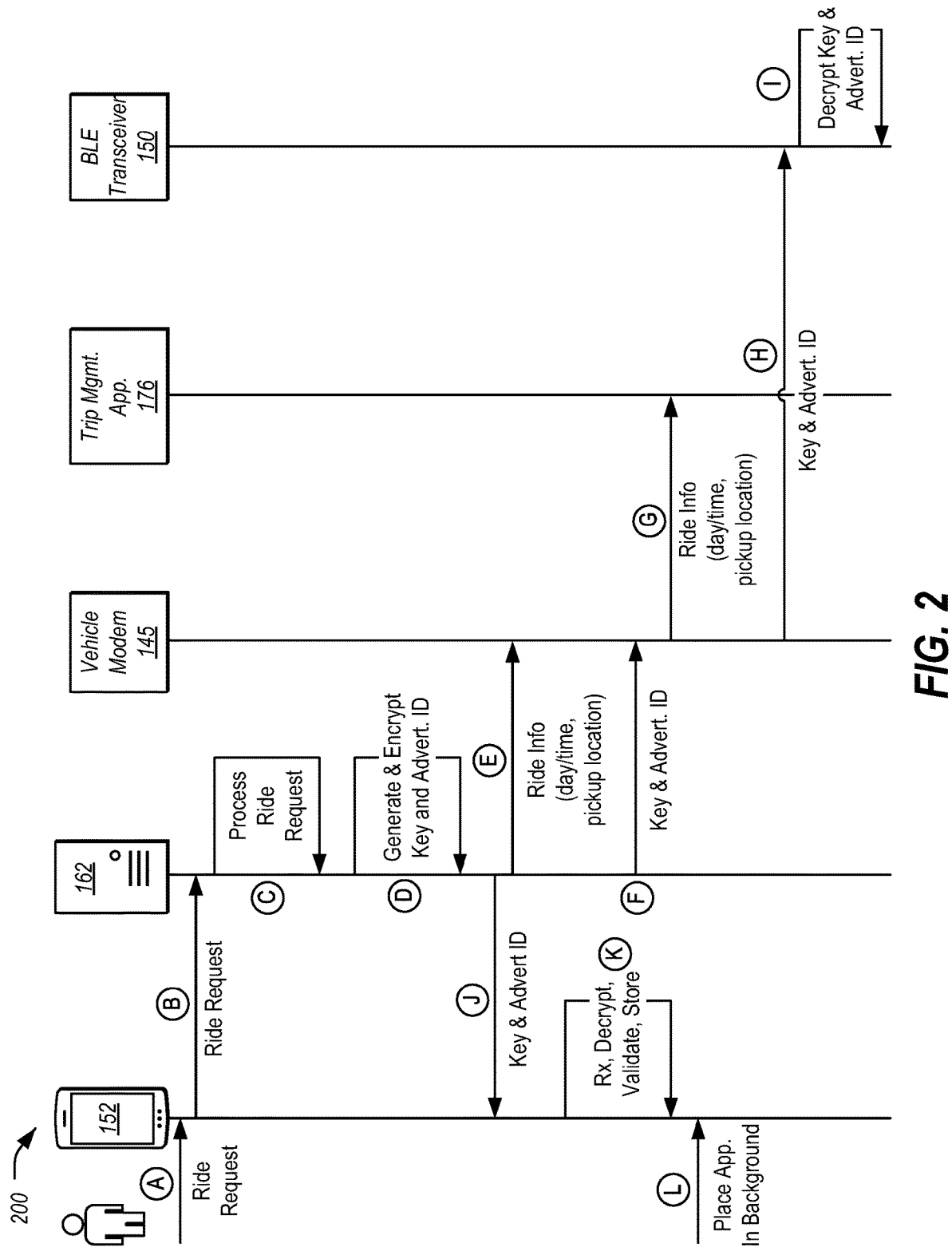
FIG. 2 illustrates an example data flow diagram for requesting use of a vehicle.

FIG. 2 illustrates an example data flow diagram 200 for requesting use of a vehicle 102. The diagram 200 begins at index (A) with a user requesting a ride uses the share application 170 on the mobile device 152. In doing so, the user may provide information such as time and day of pickup and pickup location. At index (B) this request may be sent from the mobile device 152 to the share server 162 via the communications network 156.

Responsive to receipt of the request, at index (C) the share server 162 processes the ride request to determine the best vehicle 102, location and time to fulfill the user's request, and sends the proposal to the user. Responsive to receipt of user approval of the proposed reservation, at index (D) the share server 162 may generate a cryptographic key and a unique advertisement ID. In BLE, when a peripheral device is in advertising mode, advertising packets are sent periodically on each advertising channel. The advertisements typically include a Universal Unique Identifier (UUID), which is a unique 128-bit value. When a peripheral device sends an advertisement, it is providing an indication for central devices such as mobile devices 102 to find it. Once found, the central device can begin the connection process. Notably, both the key and the advertisement ID are applicable only for the scheduled reservation, and neither can be reused for different vehicles 102, or at days/times other than for the trip scheduled. Both the key and the ID may be transmitted to the mobile device 152 in an encrypted form.

At index (E), the ride information (e.g., day/time of the trip, pickup location for the trip, ending location for a trip, amount of time for the vehicle 102 to be used, etc.) may be sent to the vehicle 102 through the communications network 156 to the vehicle modem 145. At index (F), the key and advertisement ID may also be sent to the vehicle 102. At index (G) the ride information may be forwarded to the trip management application 176, while at index (H) the key and advertisement ID may be forwarded to the BLE transceiver 150. At index (I), the BLE transceiver 150 may decrypt the key and advertisement ID for use in transmission.

The advertisement ID may be provided in various formats, but is often a 128-bit number in accordance with BLE standards. When the day/time and location conditions are met, the number may be periodically transmitted by the BLE transceiver 150 of the vehicle 102 in the form of a BLE advertisement packet, as explained in further detail below.

At index (J), the mobile device 152 may receive the key and advertisement ID from the back-end server. Responsive to receipt of the key and advertisement ID, at index (K) the mobile device 152 may decrypt the received information, validate that the key and advertisement ID are of a proper format, and store the key and advertisement ID in the storage 168 of the mobile device 152. At index (L), the share application 170 may optionally be turned off or placed in the background (if iBeacon, Eddystone, or another location awareness protocol is implemented).

Figure 3:
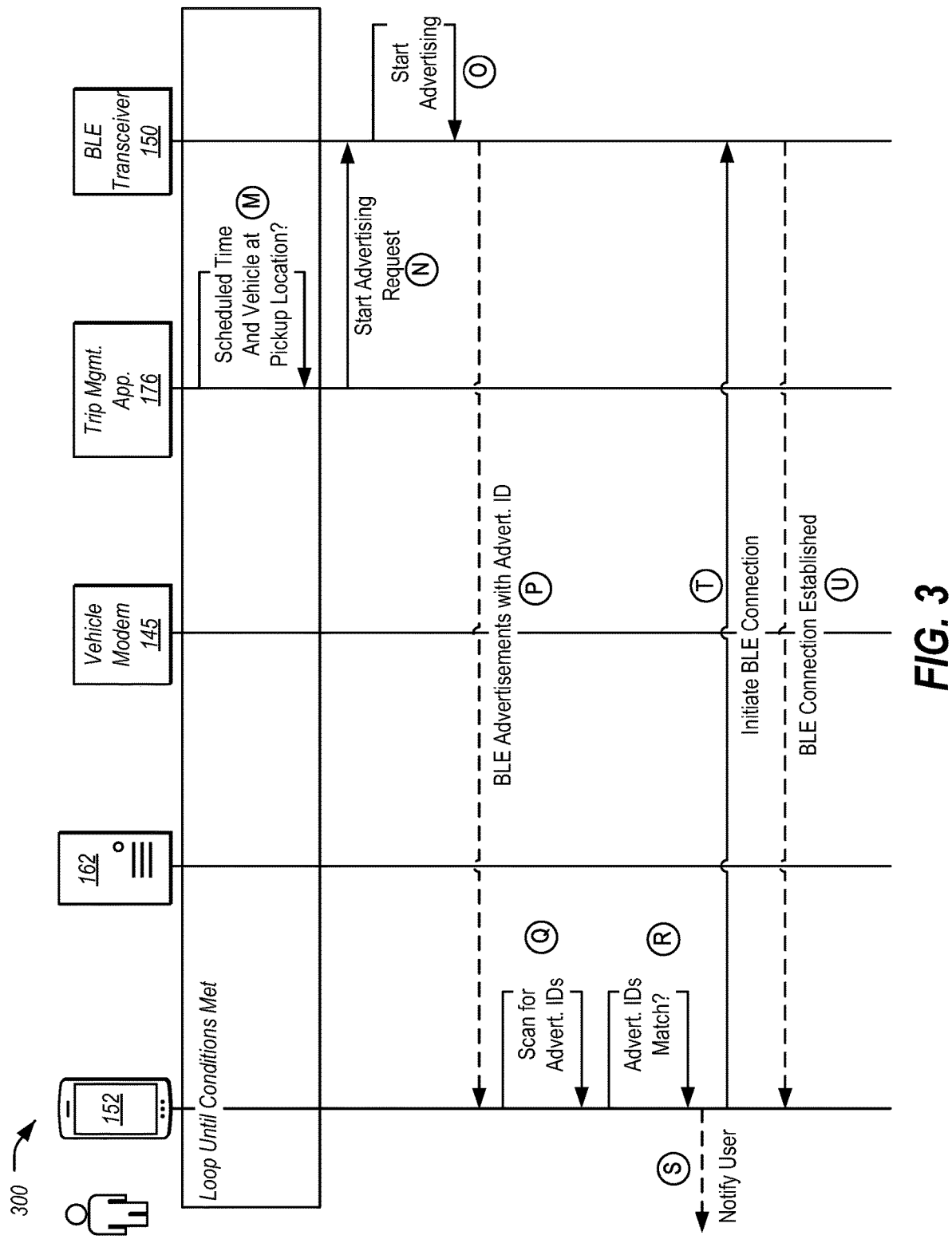
FIG. 3 illustrates an example data flow diagram for initiating connection of the mobile device to the vehicle.

FIG. 3 illustrates an example data flow diagram 300 for initiating connection of the mobile device 152 to the vehicle 102. At index (M), the trip management application 176 determines according to the trip information whether the scheduled time for the sharing has arrived, and further whether the vehicle 102 is at the specified pickup location. Accordingly, the BLE transceiver 150 may be directed to not transmit the BLE advertisement packet until the BLE transceiver 150 receives a request from the trip management application 176 that the vehicle 102 is at the pick-up location and the current time is within the scheduled reservation time. At index (N), the conditions are met and the trip management application 176 directs the BLE transceiver 150 to start the advertisements as shown at index (O).

By limiting the scope of the time and location of the BLE advertisements, the vehicle 102 conserves power and limits the possibility of a user with malicious intent from seeing the BLE data and attempting to connect, which could prevent the intended user from connecting (e.g., a denial-of-service attack). In addition, that the advertisement ID is unique and only used for a single instance of vehicle or ride sharing limits a spoofing attack where a hacker may attempt to reuse the same advertisement ID to lure other users to unintentionally connect to the hacker's device.

At index (P) the BLE advertisements are periodically transmitted by the BLE transceiver 150 to be heard by the mobile device 152. Accordingly, at index (Q) the mobile device 152 may scan for the matching advertisement packet transmitted by the vehicle 102. For instance, the mobile device 152 may scan for advertisements that include an advertisement ID, and may check at index (R) to determine whether the advertisement ID matches the advertisement ID received from the share server 162 at index (J). If the advertising IDs are a match, at index (S) the user of the mobile device 152 may be notified (e.g., via a sound, or visual alert provided via the mobile device 152), and at index (T) the BLE transceiver 154 of the mobile device 152 and the BLE transceiver 150 of the vehicle 102 may be used to initiate a BLE connection. The BLE connection may be established at index (U).

It should be noted that the advertisement packets may be configured as iBeacon-compatible data packets for an iOS implementation, or in another example with Eddystone packets in an Android implementation. Further, the mobile device 152 may periodically scan for iBeacon packets, which may be useful if the mobile device 152 does not have the share application 170 running. Receiving the iBeacon packet from the vehicle 102 may cause the mobile device 152 to trigger to open the associated share application 170 in the background. This allows the user not having the share application 170 running on their mobile device 152 to have that application be automatically invoked when the vehicle 102 is detected, without requiring user interaction.

Thus, the scanning followed by the initiation of a Bluetooth connection with the vehicle 102, allows the describes procedures to be performed while the mobile device 152 is locked, so long as the share application 170 is running in the background. Other potential implementations may require the user to have the share application 170 running in the foreground and the mobile device 152 unlocked, especially for the iOS operating system, which has strict requirements on what type of BLUETOOTH tasks may be performed in the background. The share application 170 may optionally provide a notification to the user that the connection has been established, for example, a message that appears on the lock screen of the mobile device 152.

FIG. 4 illustrates an example data flow diagram 400 for securing and using the connection between the mobile device 152 and the vehicle 102. At indexes (V) and (W), responsive to the BLE connection being established, the vehicle 102 and mobile device 152 may use the cryptographic keys to authenticate one other. This may be done by using the keys to establish a secure session or with other known methods of authentication. Further aspects of using keys to establish a secure session with the vehicle 102 is discussed in detail in U.S. patent Ser. No. 15/432,866, which is incorporated herein by reference in its entirety.

If the authentication fails, at index (X) the BLE transceiver 150 of the vehicle 102 may close the BLUETOOTH connection with the mobile device 152 to prevent any further communication with the unauthenticated mobile device 152. The vehicle 102 may also restart transmission of the advertisement packet in case the failed connection was with an unintended mobile device 152, so that the intended user's mobile device 152 still may be able to connect to the vehicle 102.

Following a successful connection and authentication, the Bluetooth connection may be maintained between the mobile device 152 and vehicle 102 to provide additional functionality (e.g., user control of vehicle features like temperature and climate control) during the trip. For instance, at index (Y), the mobile device 152 may send a message via the secure connection to indicate termination of the ride for the user (e.g., that the user wishes to terminate and exit the vehicle 102, to adjust a radio or climate setting of the vehicle 102, etc.). As another possibility, at index (Z) the vehicle 102 may send information to the mobile device 152 indicative of vehicle 102 information, such as current climate or radio settings, available features for configuration, vehicle 102 location along a route, etc.

It should be noted that vehicles 102 may transmit advertisements for multiple users, or for other users once a user is connected. For instance, a vehicle 102 may be used for multiple users in a ride-share. In such a case, the vehicle 102 may be configured to provide multiple different advertisements. If a ride-share includes two riders, as one possibility the vehicle 102 may alternate the advertisements for the two different users to connect and authenticate to the vehicle 102. Once a user has been authenticated, that advertisement may be removed from the rotation of advertisements.

FIG. 5 illustrates an example data flow diagram 500 for operations performed relating to conclusion of a trip. At index (a), the trip management application 176 monitors for conclusion of the trip. In an example, the trip management application 176 may determine whether a destination indicated in the ride information was reached. In another example, the trip management application 176 may determine whether the time period for use of the vehicle 102 has expired. In yet a further example, the trip management application 176 may determine that the user has ended the ride responsive to user input to the mobile device 152 or to the HMI controls 136 of the vehicle 102. Responsive to determining that the trip has ended, the trip management application 176 causes the vehicle 102 to end the BLUETOOTH connection.

Additionally, responsive to conclusion of the trip, the trip management application 176 may cause the key and advertisement ID to be discarded to ensure they will no longer be used. In an example, at index (β) the trip management application 176 may send a remove key request to the BLE transceiver 150, which at index (γ) may remove the key and advertisement ID from storage of the BLE transceiver 150. In another example, at index (δ) the trip management application 176 may send a remove key request to the mobile device 152, which at index (ε) may remove the key and advertisement ID from the mobile device 152. Notably, regardless of whether the key is removed successfully from the mobile device 152, the key cannot be reused and the vehicle 102 will not use the advertisement again, preventing the mobile device 152 from detecting the vehicle 102 again.

Computing devices described herein generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, JAVA™, C, C++, C#, VISUAL BASIC, JAVA SCRIPT, PERL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a memory;
a transceiver; and
a processor programmed to
send a request for a ride to a share server from a share application installed to the memory and executing in a foreground mode,
receive a key and an advertisement identifier from the share server responsive to the send of the request for the ride, the key and the advertisement identifier both being applicable only to the ride and not otherwise usable for other rides,
store the advertisement identifier to the memory,
place the share application from the foreground mode into a background mode in which the share application automatically completes authentication,
wirelessly scan for the advertisement identifier stored to the memory using the transceiver in the background mode without user interaction,
responsive to detection of the advertisement identifier from the scan, automatically trigger the share application in the background mode without user interaction,
establish a local connection to a vehicle sending an advertisement that matches the advertisement identifier using the share application in the background mode without user interaction, and
gain access to the vehicle for the ride using the local connection.

2. The system of claim 1, wherein the key and the advertisement identifier are encrypted, and the processor is further programmed to decrypt the key and the advertisement identifier.

3. The system of claim 1, wherein the advertisement identifier is a 128-bit unique identifier.

4. The system of claim 1, wherein the local connection is a BLUETOOTH Low Energy (BLE) connection, and the advertisement is a BLE advertisement.

5. The system of claim 1, wherein the advertisement is an iBeacon-compatible data packet, and the processor is further programmed to trigger execution of the share application responsive to receipt of the advertisement.

6. The system of claim 1, wherein the processor is further programmed to delete the advertisement identifier from the memory responsive to completion of the ride.

7. The system of claim 1, wherein the advertisement identifier is received by the vehicle from the share server.

8. The system of claim 1, the vehicle comprising: a vehicle modem; a vehicle transceiver; and a vehicle processor programmed to responsive to occurrence of a scheduled time and location for initiating access to the vehicle, direct the vehicle transceiver to periodically provide advertisements including the advertisement identifier as received from the share server via the vehicle modem, and establish, using the vehicle transceiver and the key as sent to the vehicle and the mobile device from the share server, the local connection as a secure connection with the mobile device responding to the advertisements.

9. The system of claim 8, wherein the key and the advertisement identifier are encrypted, and the vehicle processor is further programmed to decrypt the key and the advertisement identifier.

10. The system of claim 8, wherein the advertisement identifier is a 128-bit unique identifier.

11. The system of claim 8, wherein the secure connection is a BLUETOOTH Low Energy (BLE) connection, and the advertisements are BLE advertisements.

12. The system of claim 8, wherein the advertisements are iBeacon-compatible data packets or Eddystone-compatible data packets configured to trigger execution of a share application of the mobile device responsive to receipt of the advertisement by the mobile device.

13. The system of claim 8, wherein the vehicle processor is further programmed to delete the advertisement identifier from a vehicle memory of the vehicle responsive to completion of access to the vehicle.

14. The system of claim 13, wherein the vehicle processor is further programmed to: receive trip information from the share server; and determine completion of access to the vehicle responsive to one or more of expiration of a period of time specified by the trip information, movement of the vehicle to a destination location specified by the trip information, or receipt of user input indicative of an explicit end of a trip.

15. The system of claim 8, wherein the vehicle processor is further programmed to, responsive to unsuccessful establishment of the secure connection, direct the vehicle transceiver to resume to periodically provide the advertisements including the advertisement identifier.

16. The system of claim 8, wherein the vehicle processor is further programmed to: receive the advertisement identifier and a second advertisement identifier from the share server; and direct the transceiver to alternate providing advertisements including the advertisement identifier and the second advertisement identifier.

17. The system of claim 8, wherein the vehicle processor is further programmed to adjust a setting of the vehicle responsive to a command received over the secure connection from the mobile device.

18. The system of claim 1, wherein the processor is further programmed to utilize the share application to provide a notification of the detection of the advertisement identifier, despite the share application being in the background mode.

19. The system of claim 18, wherein the background mode includes the system being locked, and to provide the notification includes to display a message on a lock screen of the system.

20. The system of claim 18, wherein the background mode includes the system being locked.

21. A method comprising:
sending a request for a ride to a share server from a share application installed to a memory and executing in a foreground mode;
receiving, by a mobile device, a key and an advertisement identifier from the share server responsive to the request for the ride sent from the mobile device, the key and the advertisement identifier both being applicable only to the ride and not otherwise usable for other rides;
placing the share application from the foreground mode into a background mode in which the share application automatically completes authentication;
wirelessly scanning for the advertisement identifier by the mobile device in the background mode without user interaction;
responsive to detection of the advertisement identifier from the scanning, automatically triggering the share application in the background mode without user interaction;
establishing a local connection to a vehicle responsive to receiving an advertisement from the vehicle that matches the advertisement identifier using the share application in the background mode without user interaction; and
gaining access to the vehicle for the ride using the local connection.

22. The method of claim 21, further comprising:
generating the advertisement identifier by the share server responsive to receipt of the request for the ride; and
sending the advertisement identifier from the share server to the vehicle and to the mobile device.

23. The method of claim 21, further comprising:
responsive to occurrence of a scheduled time and location for initiating access to the vehicle, periodically providing advertisements including the advertisement identifier, and
establishing, using the key as sent to the vehicle and the mobile device from the share server, a secure connection with the mobile device responding to the advertisements.

* * * * *